US006234646B1

United States Patent
Ito

(10) Patent No.: US 6,234,646 B1
(45) Date of Patent: May 22, 2001

(54) VEHICULAR SIGNAL LAMP HAVING A PLURALITY OF LIGHT-EMITTING DIODES

(75) Inventor: Hiroyuki Ito, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 09/358,452

(22) Filed: Jul. 21, 1999

(30) Foreign Application Priority Data

Jul. 24, 1998 (JP) .................................................. 10-209460

(51) Int. Cl.[7] ......................................................... F21V 1/00
(52) U.S. Cl. .......................... 362/235; 362/545; 362/518; 362/241
(58) Field of Search ..................................... 362/235, 545, 362/241, 247, 518, 516, 540, 541, 542

(56) References Cited

U.S. PATENT DOCUMENTS

| 4,729,076 | * | 3/1988 | Masami et al. ....................... 362/235 |
| 5,152,601 | * | 10/1992 | Ferng ................................... 362/183 |
| 5,838,247 | * | 11/1998 | Bladowski ....................... 340/815.45 |
| 5,947,587 | * | 9/1999 | Keuper et al. ........................ 362/235 |

* cited by examiner

Primary Examiner—Alan Cariaso
Assistant Examiner—Ronald E. DelGizzi

(74) Attorney, Agent, or Firm—Weingarten, Schurgin, Gagnebin & Hayes LLP

(57) ABSTRACT

A signal lamp for a vehicle is composed of a plurality of LED lamps as a light source, a reflecting surface corresponding to the light-emitting surface of the signal lamp, a housing for accommodating the LED lamps and the reflecting surface, and an outer lens disposed in opposing relation to the reflecting surface. The LED lamps are arranged along the periphery of the light-emitting surface such that the illuminating direction thereof is toward the center of the reflecting surface. The reflecting surface is partitioned into segments corresponding in number to the LED lamps. Preferably, the reflecting surface has a circular configuration. The segments into which the reflecting surface is partitioned are arranged radially around the center of the reflecting surface. In this case, the LED lamps are arranged in an annular configuration along the periphery of the reflecting surface. As the LED lamps, there are used plural pairs of LED lamps, each pair of LED lamps being disposed in opposing relation to each other with the center axis of the reflecting surface interposed therebetween. In this case, the reflecting surface is composed of two types of reflecting portions being alternately arranged, one for reflecting a light beam from one of each pair of opposing LED lamps and the other for reflecting a light beam from the other of each pair of opposing LED lamps. A shade for blocking direct light beams from the LED lamps is provided adjacent the LED lamps.

8 Claims, 2 Drawing Sheets

VEHICULAR SIGNAL LAMP HAVING A PLURALITY OF LIGHT-EMITTING DIODES

BACKGROUND OF THE INVENTION

1. Field of the Invention

The present invention relates to a signal lamp for a vehicle such as a tail lamp, a stop lamp, a turn signal lamp, or the like. More particularly, the present invention relates to a signal lamp for a vehicle using a plurality of light-emitting diode (hereinafter referred to as LED) lamps as a light source.

2. Background Art

FIGS. 1 and 2 illustrate a conventional signal lamp 90 for a vehicle using a plurality of LED lamps 91 as a light source. By way of example, the plurality of LED lamps 91 are arranged in rows and columns to correspond to a light-emitting surface 90a of the signal lamp 90 for a vehicle. The plurality of LED lamps 91 are mounted on, e.g., a printed circuit board 92 and disposed in a housing 93. There is also provided an outer lens 94 for covering the LED lamps 91 in opposing relation to the light-emitting surface 90a.

The LED lamps 91 has a beam-like light distribution property with a comparatively narrow illuminating angle. To confer a desired light distribution property to the signal lamp 90 for a vehicle, lens cuts 94a corresponding to the individual LED lamps 91 are imparted to the outer lens 94. The lens cuts 94a allow light beams from the LED lamps 91 to be diffused properly.

Since the LED lamps 91 have narrow illuminating angles in the conventional signal lamp 90 for a vehicle thus constructed, light beams from the adjacent LED lamps 91 are not diffused sufficiently. Thus, when the light beams from the adjacent LED lamps 91 reach the outer lens 94, overlapping portions therebetween may be very little (see FIG. 2). In other words, the outer lens 94 has portions on which the light beams are not incident. This satisfies the specifications of the signal lamp 90 in terms of the light distribution property but bright portions with the incident light and dark portions without the incident light are observed when the light-emitting surface 90a of the outer lens 94 are viewed directly by a viewer, resulting in a speckled pattern (see FIG. 1). What results is the problem of a significantly impaired appearance of the lamp for a vehicle.

The above mentioned problem can be solved by reducing the pitch of the LED lamps 91 disposed. In this case, however, the pitch reduced to ½ quadruples the number of LED lamps 91 to be mounted in the housing 93. This leads to some new problems of a temperature rise or a higher cost due to an increased number of LED lamps 91 to be mounted as well as an increased number of mounting steps during manufacturing.

SUMMARY OF THE INVENTION

It is therefore an object of the present invention to provide a signal lamp for a vehicle in which the entire light-emitting surface emits light with uniform illuminance and thereby solve the foregoing problems.

Another object of the present invention is to provide a signal lamp for a vehicle which performs light emission with uniform illuminance free from uneven illumination by using a smaller number of LED lamps than that used in a conventional signal lamp for a vehicle.

In order to attain the above mentioned objects, the present invention provides a signal lamp for a vehicle, comprising: a plurality of LED lamps as a light source; a reflecting surface corresponding to a light-emitting surface of the signal lamp; a housing for accommodating the LED lamps and the reflecting surface; and an outer lens disposed in opposing relation to the reflecting surface, the LED lamps being arranged along a periphery of the light-emitting surface such that an illuminating direction thereof is toward a center of the reflecting surface, the reflecting surface being partitioned into segments corresponding in number to the LED lamps.

In one aspect of the present invention, the reflecting surface may have a circular configuration. In this case, the segments into which the reflecting surface is partitioned are arranged radially around the center of the reflecting surface. On the other hand, the LED lamps are arranged in an annular configuration along the periphery of the reflecting surface.

In another aspect of the present invention, the LED lamps are plural pairs of LED lamps, each pair of LED lamps being disposed in opposing relation to each other with a center axis of the reflecting surface interposed therebetween.

In still another aspect of the present invention, the reflecting surface is composed of two types of reflecting portions being alternately arranged, one for reflecting a light beam from one of each pair of opposing LED lamps and the other for reflecting a light beam from the other of each pair of opposing LED lamps.

Preferably, a shade for blocking direct light beams from the LED lamps is provided adjacent the LED lamps.

With the signal lamp for a vehicle according to the present invention, it becomes possible to illuminate the entire reflecting surface even with light beams from the LED lamps having comparatively narrow illuminating angles. This increases the illuminated area, allows the entire light-emitting surface to glow with uniform illuminance, and prevents uneven illumination.

With the reflecting surface thus constructed, the area illuminated with light beams from the LED lamps is increased so that the light emitting surface is allowed to glow without uneven illumination by using a smaller number of LED lamps than in a conventional signal lamp for a vehicle with the light emitting surface having the same area. Hence, the reflecting surface is highly effective in reducing cost and the number of mounting steps for the signal lamp for a vehicle.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Figure 1:
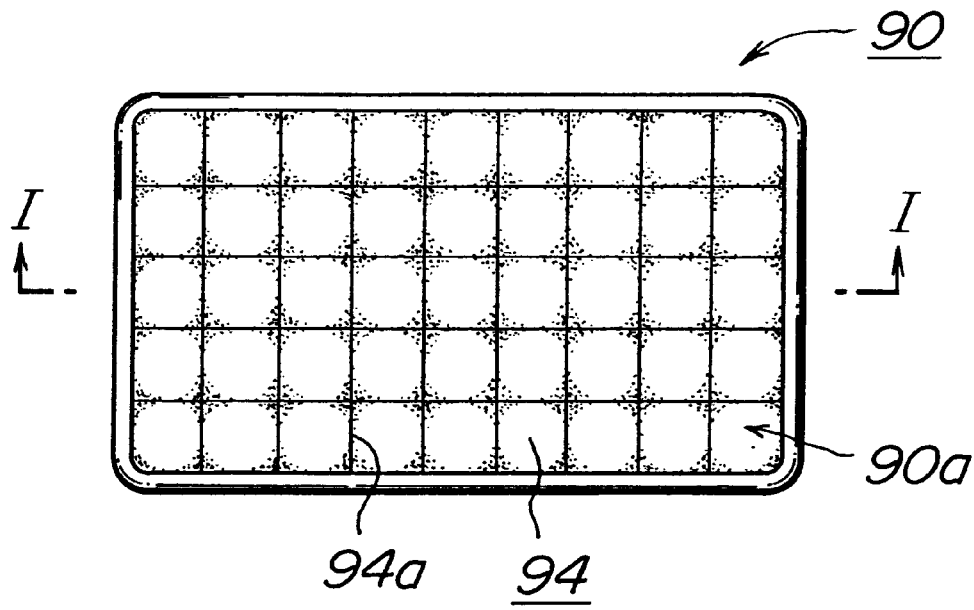
FIG. 1 is a front view illustrating a conventional embodiment.
Figure 2:
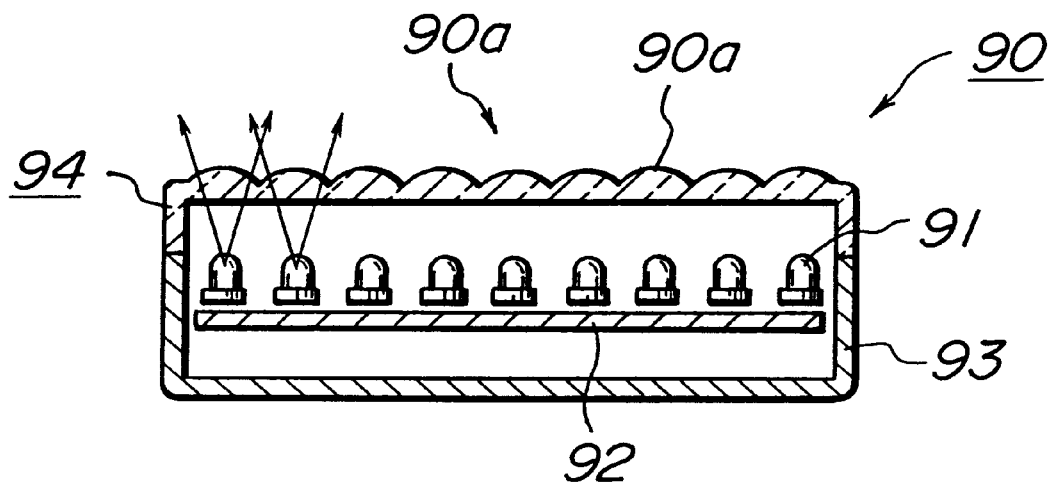
FIG. 2 is a cross-sectional view taken along the line I—I of FIG. 1.
Figure 3:
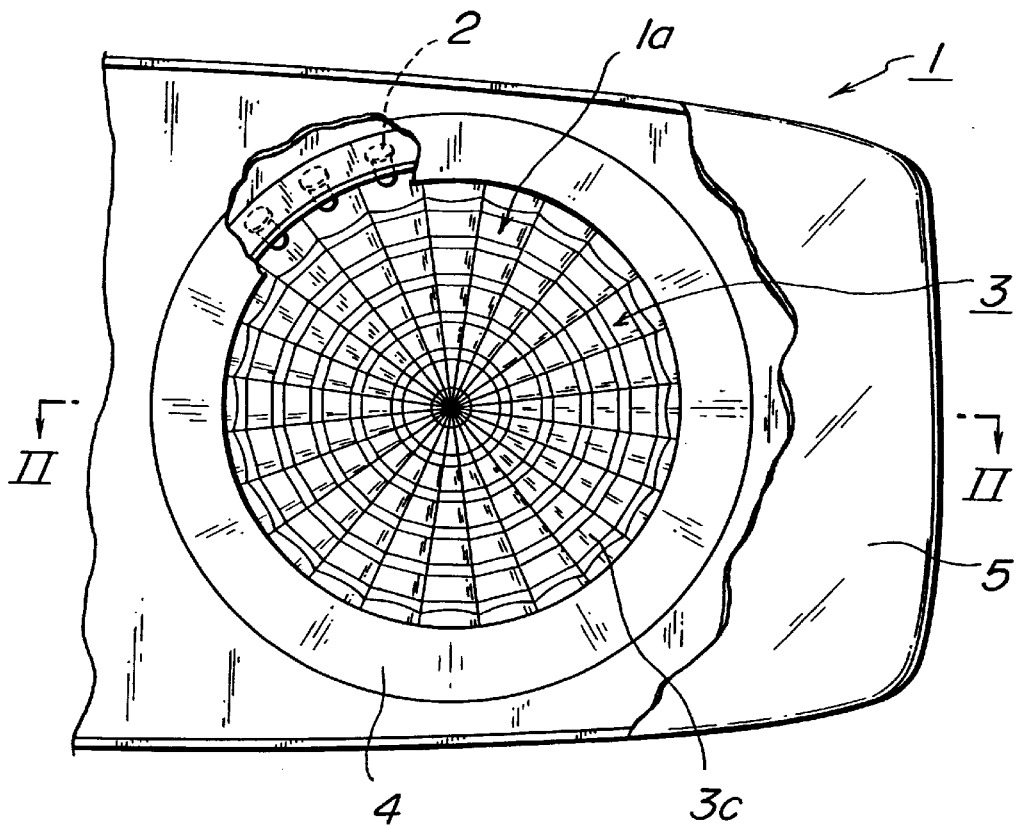
FIG. 3 is a front view of a signal lamp for a vehicle according to an embodiment of the present invention, which is partly shown in an exploded state.
Figure 4:
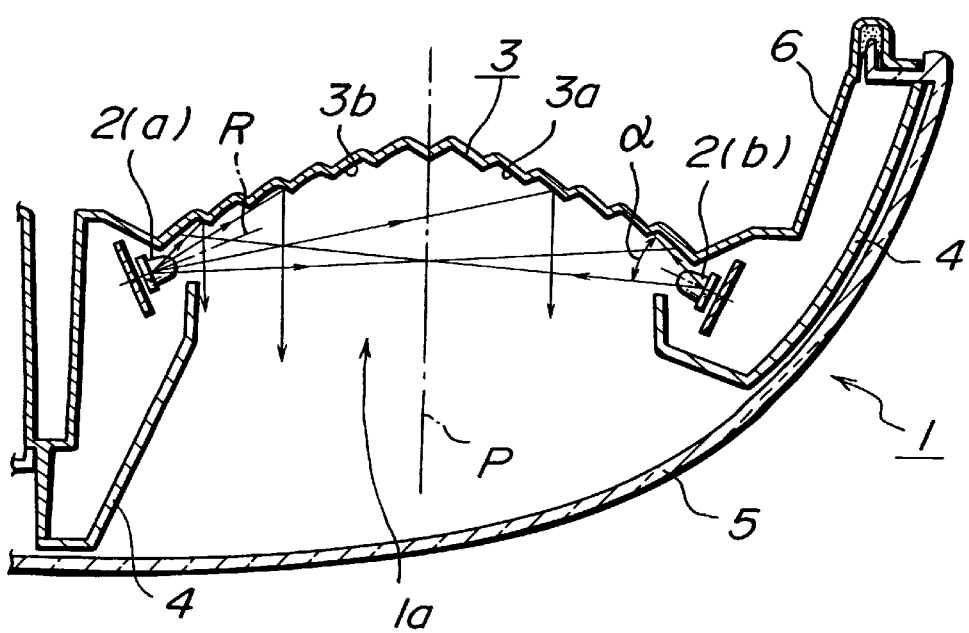
FIG. 4 is a cross-sectional view taken along the line II—II of FIG. 3.

The present invention will now be described in detail with reference to the drawings which illustrate the embodiments thereof. In FIGS. 3 and 4, a reference numeral 1 denotes a signal lamp for a vehicle according to the present invention. The signal lamp 1 for a vehicle is composed of: a plurality of LED lamps 2 as a light source; a reflecting surface 3; a shade 4; and an outer lens 5.

In accordance with the present invention, the reflecting surface 3 is provided to roughly correspond to the light-emitting surface 1a to which the LED lamps are disposed to correspond in the conventional lamp. The LED lamps 2 are positioned to direct light to the reflecting surface 3. That is, light beams emitted from the plurality of LED lamps 2 are reflected by the reflecting surface 3 to travel in the illuminating direction of the lamp 1 in accordance with the present invention. The light distribution property required of the lamp 1 for a vehicle is formed at the time of reflection by the reflecting surface 3. To satisfy the foregoing requirement, the plurality of LED lamps 2 are disposed along the periphery of the reflecting surface 3 and have respective light-emitting center axes R directed toward the reflecting surface 3. In the present embodiment, the reflecting surface 3 has a circular configuration, while the plurality of LED lamps 2 are arranged in an annular configuration along the periphery of the reflecting surface 3.

In the signal lamp 1 for a vehicle according to the present invention, direct light beams from the plurality of LED lamps 2 are not used as illuminating light from the lamp 1. Accordingly, the shade 4 is provided adjacent the LED lamps 2 such that the LED lamps 2 are not directly viewed when a viewer looks in the signal lamp 1 for a vehicle from the outer lens side.

As the LED lamps 2, the present invention has adopted LED lamps which are typical commercially available and each of which has an illuminating angle α of about 30° to 40°. The LED lamps 2 are located along the periphery of the reflecting surface 3 such that each diametrically opposing two of the LED lamps 2 are paired up with the center axis P of the reflecting surface 3 interposed therebetween. In the drawings, a reference numeral 6 denotes a housing. Although the housing 6 is formed integrally with the reflecting surface 3 in the present embodiment, it is not limited thereto.

The reflecting surface 3 is configured such that it is present within the limits of the illuminating angle α of each of the LED lamps 2. As shown in FIG. 4, a plurality of reflecting portions 3a and 3b are alternately arranged to compose the reflecting surface 3. Each of the reflecting portions 3a is for reflecting a light beam from the corresponding LED lamp 2(a) which is one of each pair of LED lamps 2 disposed in opposing relation to each other with the center axis P interposed therebetween. On the other hand, each of the reflecting portions 3b is for reflecting a light beam from the corresponding LED lamp 2(b) which is the other of each pair of LED lamps 2.

The reflecting portions 3a are adapted to reflect substantially equal amounts of light in reflecting light beams from the LED lamps 2(a). Specifically, the reflecting portions 3a positioned closer to the LED lamps 2(a) have comparatively small areas, while the reflecting portions 3a positioned farther away from the LED lamps 2(a) have comparatively large areas. Likewise, the reflecting portions 3b for reflecting light beams from the LED lamps 2(b) are also adapted to reflect substantially equal amounts of light. In addition, the reflecting portions 3a adapted to reflect incident light from the LED lamps 2(a) and the reflecting portions 3b adapted to reflect incident light from the LED lamps 2(b) are paired up to form segments 3c each corresponding to one pair of LED lamps 2.

Since the LED lamps 2(a) and the LED lamps 2(b) in respective pairs are disposed in opposing relation to each other with the center axis P of the reflecting surface 3 interposed therebetween, the segments 3c correspond in number to the LED lamps 2 used in the signal lamp 1 for a vehicle. In the case of using a circular reflecting surface 3 as used in the present embodiment, the segments 3c are arranged in a radial configuration around the center axis P.

Next, a description will be given to the operation and effect of the signal lamp 1 for a vehicle according to the present embodiment thus constructed.

In accordance with the present invention, the light beams emitted from the LED lamps 2 are temporarily incident upon the reflecting surface 3 and then reflected thereby to travel in the illuminating direction. Since the segment 3c corresponding to one pair of LED lamps 2 is within the limits of the illuminating angle α of each of the LED lamps 2, the light beams emitted from the LED lamps 2 reach the entire surface of the segment 3c.

Since the whole reflecting surface 3 is formed of the group of segments 3c, the light beams emitted from the LED lamps 2 reach the entire surface of the reflecting surface 3. Hence, uneven light illumination at the light-emitting surface 1a is prevented. With the aforesaid construction, a light-emitting area for each LED lamp 2 according to the present invention is increased compared with the light-emitting area in the conventional embodiment. Therefore, a smaller number of LED lamps 2 are sufficient for the light-emitting surface having the same area as in the conventional lamp.

While the presently preferred embodiment of the present invention has been shown and described, it will be understood that the present invention is not limited thereto, and that various changes and modifications may be made by those skilled in the art without departing from the scope of the invention as set forth in the appended claims.

What is claimed is:

1. A signal lamp for a vehicle, comprising:
   a plurality of light-emitting diode (LED) lamps as a light source;
   a reflecting surface corresponding to a light-emitting surface of said signal lamp;
   a housing for accommodating said LED lamps and the reflecting surface; and
   an outer lens disposed in opposing relation to the reflecting surface,
   said LED lamps being arranged along a line at a periphery of the light-emitting surface such that an illuminating direction thereof is toward a center of said reflecting surface and said LED lamps being directed at an angle towards a back portion of said signal lamp,
   said reflecting surface being of a convex shape and located at said back portion of said signal lamp, and
   said reflecting surface being partitioned into segments corresponding in number to said LED lamps,
   said reflecting surface being stair shaped, said reflecting surface being configured as a plurality of reflecting portions that are alternately arranged to compose said reflecting surface, wherein a first one of said reflecting portions is for reflecting a light beam from a first one of said LED lamps which is one of a pair of said LED lamps disposed in opposing relation to each other with a center axis of said reflecting surface interposed therebetween, and wherein a second one of said reflecting portions is for reflecting a light beam from a second one of said LED lamps which is the other of said pair of LED lamps disposed in opposing relation to each other.

2. The signal lamp for a vehicle according to claim 1, wherein said reflecting surface has a circular configuration, the segments into which the reflecting surface is partitioned are arranged radially around the center of the reflecting surface, and said LED lamps are arranged in an annular configuration along the periphery of said reflecting surface.

3. The signal lamp for a vehicle according to claim 1, wherein said LED lamps are plural pairs of LED lamps, each pair of LED lamps being disposed in opposing relation to each other with a center axis of the reflecting surface interposed therebetween.

4. The signal lamp for a vehicle according to claim 3, wherein said reflecting surface is composed of two types of reflecting portions being alternately arranged, one for reflecting a light beam from one of each pair of opposing LED lamps and the other for reflecting a light beam from the other of each pair of opposing LED lamps.

5. The signal lamp for a vehicle according to claim 2, wherein said LED lamps are plural pairs of LED lamps, each pair of LED lamps being disposed in opposing relation to each other with a center axis of the reflecting surface interposed therebetween.

6. The signal lamp for a vehicle according to claim 5, wherein said reflecting surface is composed of two types of reflecting portions being alternately arranged, one for reflecting a light beam from one of each pair of opposing LED lamps and the other for reflecting a light beam from the other of each pair of opposing LED lamps.

7. The signal lamp for a vehicle according to claim 1, wherein a shade for blocking direct light beams from said LED lamps is provided adjacent said LED lamps.

8. The signal lamp for a vehicle according to claim 2, wherein a shade for blocking direct light beams from said LED lamps is provided adjacent said LED lamps.

* * * * *